(No Model.) 2 Sheets—Sheet 1.
G. & J. E. BOHNER.
EXTENSION LAMP.
No. 285,381. Patented Sept. 25, 1883.
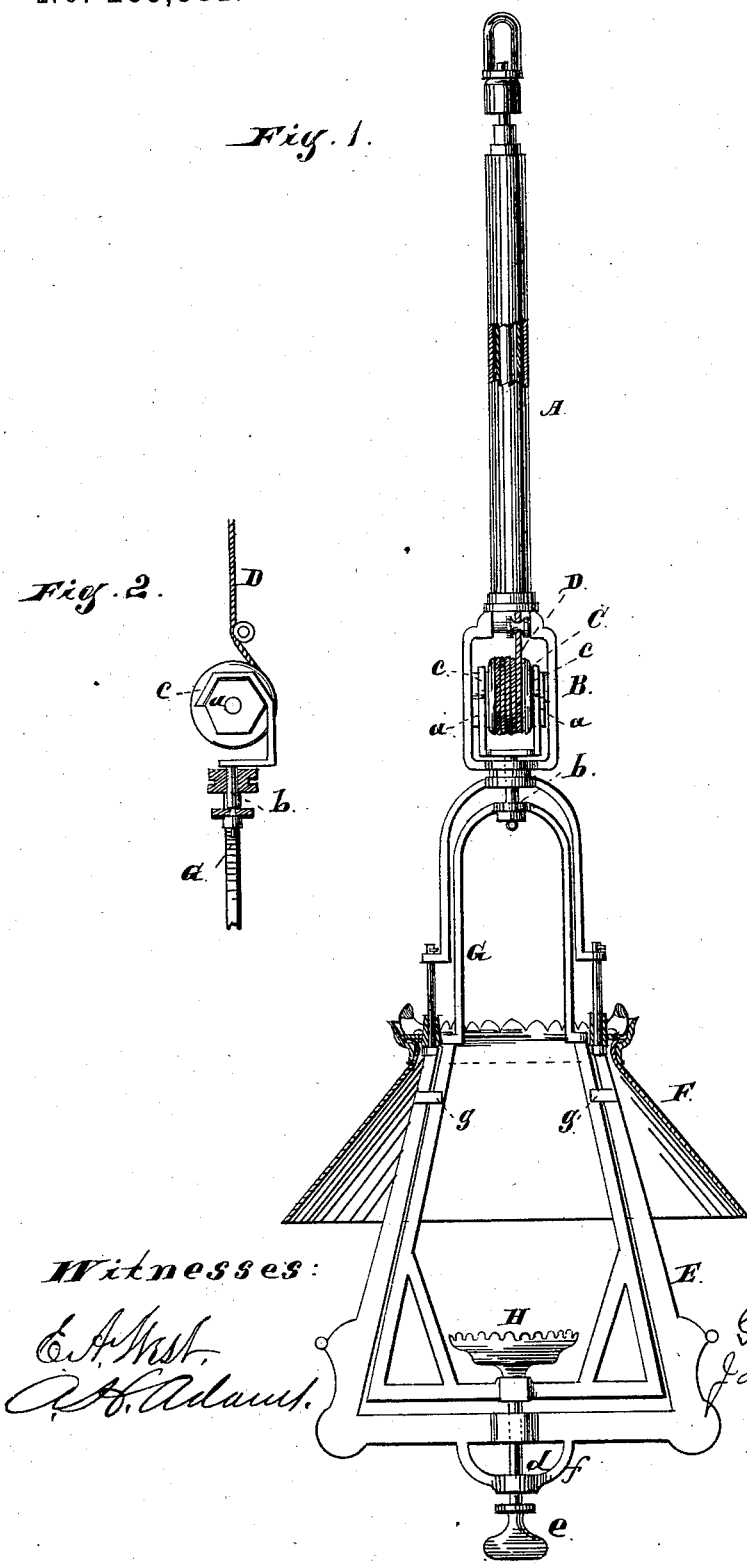

(No Model.) 2 Sheets—Sheet 2.

G. & J. E. BOHNER.
EXTENSION LAMP.

No. 285,381. Patented Sept. 25, 1883.

Witnesses:
E. A. West
A. H. Adams

Inventors:
George Bohner
Joseph E. Bohner

UNITED STATES PATENT OFFICE.

GEORGE BOHNER AND JOSEPH E. BOHNER, OF CHICAGO, ILLINOIS.

EXTENSION-LAMP.

SPECIFICATION forming part of Letters Patent No. 285,381, dated September 25, 1883.

Application filed January 15, 1883. (No model.)

*To all whom it may concern:*

Be it known that we, GEORGE BOHNER and JOSEPH E. BOHNER, residing at Chicago, in the county of Cook and State of Illinois, and citizens of the United States, have invented new and useful Improvements in Extension-Lamps, of which the following is a full description, reference being had to the accompanying drawings, in which—

Figure 3:
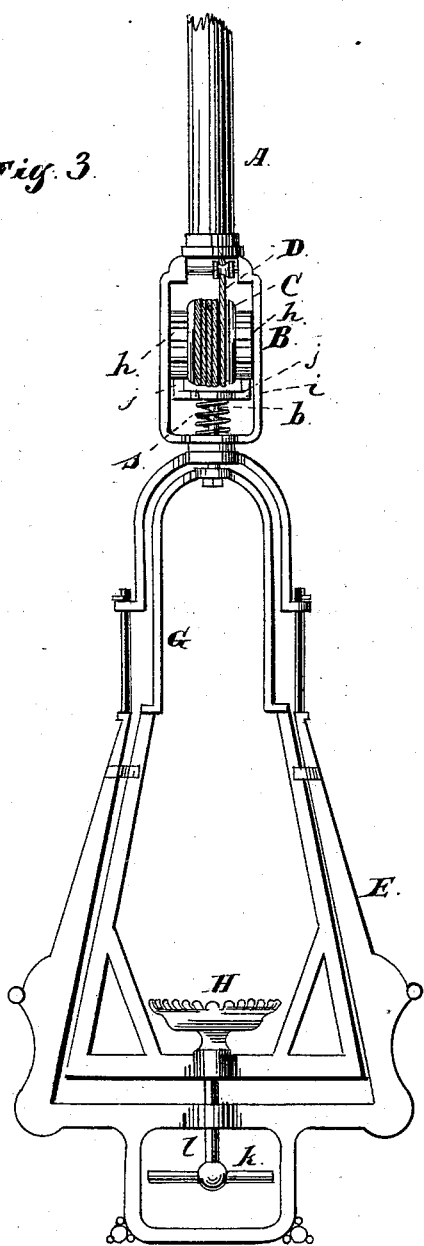
Figure 4:
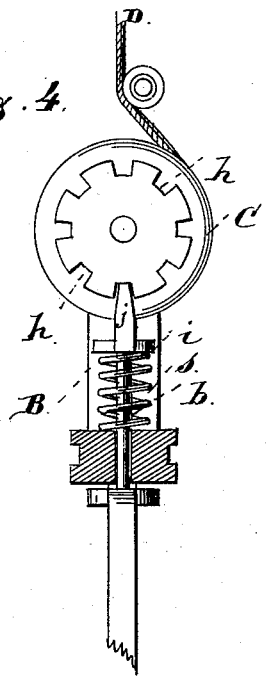
Figure 5:
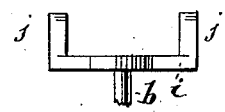

Figure 1 is an elevation; Fig. 2, a detail. Fig. 3 is an elevation, showing a modification; Figs. 4 and 5, details of the modification.

Our invention relates to the locking devices of an extension-lamp. It consists, primarily, in combining with the winding-drum, extension-tube, and main harp, which is connected with the frame which carries the winding-drum, the locking devices carried by a second harp or other device, extending down, so that it can be operated from below the lamp proper.

In the drawings, A represents an extension-tube; B, a frame; C, a winding-drum pivoted in the frame B, the shaft of which drum is six-sided upon each side, as shown at *a*. The winding-drum is provided with a spring, as usual, which is not shown.

D is a winding-cord.

E is the main harp, with which the frame B is connected.

F is a shade carried by the harp E.

G is a second harp, the upper end of which is secured to a short rod, *b*, which passes loosely through the bearing at the top of the harp E and at the bottom of the frame B.

Upon the upper end of the short rod *b* is secured the locking devices *c*, arranged as shown, one upon each side of the winding-drum, such locking device consisting, as shown in Figs. 1 and 2, of an angular piece adapted to fit over three sides of the six-sided shaft.

H is a socket, which carries the lamp proper.

*d* is a rod, the upper end of which is secured to the lower bar of the harp G. This rod *d* passes loosely through the lower bar of the outer harp, E, and its lower end is provided with a knob, *e*, to serve as a handle.

*f* is a loop for the fingers, secured to the lower bar of the harp E, through which loop the rod *d* also passes loosely.

*g* are guides to steady the harp G.

The operation is as follows: If the operator passes his fingers through the loop *f*, the knob *e* being in the palm of his hand, he can push the harp G upward a little, which will lift the locking devices *c* away from the shaft of the winding-drum, which will then be free to rotate. Then by pulling down with his fingers, having been passed through the loop *f*, as before directed, both harps and lamp-shade can be pulled down, the telescopic tube A being lengthened, as usual. When the lamp has been brought down to the desired position, if the operator releases the knob *e*, the harp G, which carries the lamp, will descend by gravity, and the locking devices *c* will be brought again into the position shown in Fig. 2 over the shaft of the winding-drum, in which position the winding-drum cannot rotate, and thus the lamp will be held in place. When the lamp is to be restored to its former position, the operator raises the locking device away from the shaft of the winding-drum, as before, and allows the action of the spring of the winding-drum to carry the harps and lamp up.

In Figs. 3, 4, and 5 we have shown a modification of our improvement, in which the locking devices engage with notches in the shaft of the winding-drum, and are held up in the notches by means of a spring. In these Figs. 3, 4, and 5, A, B, C, D, E, F, G, H, and *b* represent parts the same as those which bear the same letters in Figs. 1 and 2. *h* are notches in the shell of the winding-drum. *i* is a bar upon the top of the rod *b*, and between *i* and the lower portion of the frame B there is a coil-spring, *s*, which encircles the rod *b*. Extending upward from the bar *i* are two short projections, *j*, which engage with the notches *h* in the shell of the winding-drum. The action of the spring *s* is to hold the projections *j* in engagement with the notches *h*, in which position the winding-drum cannot rotate. *k* is a handle upon the rod *l*, which corresponds with the rod *d* in Fig. 1. Lamps constructed in accordance with this modification can be operated by taking hold of the handle *k* and pulling down thereon, which will carry down the harp G and release the parts *j* from the notches *h*. When the lower bar of the inner harp, G, comes in contact with the lower bar of the outer harp, E, if the operator continue to pull down on the handle $k$, the lamp and harps can be carried down to any desired position, and when the operator releases the handle $k$ the action of the spring $s$ will carry the parts $j$ up into the notches $h$, and the winding-drum will be locked.

In the form shown in Figs. 1 and 2 the second harp, G, or some rigid connection between the locking devices and the rod $d$, is a necessity, because the locking devices must be raised by pushing upward, and a flexible connection would not answer.

The modification shown in Fig. 3 does not require a rigid connection between the locking devices and the handle $k$, because the locking devices are released by pulling down and are returned by a spring; hence chains or cords could be connected with the lower end of the rod $b$ and carried down through the harp E, the same being hollow, or in other suitable known manner, such cords or chains being carried to and connected with a suitable handle at the lower end of the harp, by pulling down on which the locking devices can be released. In this case the lamp-socket could be placed upon the lower bar of the outside harp, G. The harp shown in Fig. 3 is better than a flexible connection, and we prefer to use it.

The shade may be supported in any suitable known manner, either by a ring at the top of the shade or at the bottom, or by arms or clamps supporting the shade either at the top or bottom thereof.

We are aware that telescopic extension-tubes have heretofore been used in connection with a spring-drum, and that notches, pins, or holes in the shells or flanges of the drum have heretofore been used in connection with locking devices, and we do not claim, broadly, any of these devices; but What we do claim, and desire to secure by Letters Patent, is as follows:

In an extension-lamp, the combination of an extension-tube, a frame connected therewith, a drum supported in the frame, a main harp connected with the drum-carrying frame, a single lamp-support supported within the harp directly under the extension-tube, a locking device for engaging and holding the winding-drum, and a second harp or other described device connected with the locking device and extending down therefrom to the lower part of the main harp, substantially as and for the purpose described.

GEORGE BOHNER.
JOSEPH E. BOHNER.

Witnesses:
E. A. WEST,
A. H. ADAMS.